United States Patent
Li et al.

(10) Patent No.: US 8,421,772 B2
(45) Date of Patent: Apr. 16, 2013

(54) RESISTIVE TOUCH CONTROL DEVICE AND DRIVING METHOD AND DRIVING CONTROLLER THEREOF

(75) Inventors: Jian-Feng Li, Taichung County (TW); Wen-Chun Wang, Taichung (TW); Chih-Chang Lai, Taichung County (TW); Kuo-Chang Su, Tainan County (TW); Gwo-Sen Lin, Taichung (TW); Chih-Hao Wang, Taichung County (TW)

(73) Assignee: Wintek Corporation, Taichung (TW)

( * ) Notice: Subject to any disclaimer, the term of this patent is extended or adjusted under 35 U.S.C. 154(b) by 483 days.

(21) Appl. No.: 12/691,741

(22) Filed: Jan. 22, 2010

(65) Prior Publication Data
US 2010/0182278 A1 Jul. 22, 2010

(30) Foreign Application Priority Data

Jan. 22, 2009 (TW) .............................. 98102561 A

(51) Int. Cl.
*G06F 3/041* (2006.01)
*G06F 3/045* (2006.01)

(52) U.S. Cl.
USPC .......................................... 345/174; 178/18.05

(58) Field of Classification Search .................. 345/174, 345/173; 178/18.05
See application file for complete search history.

(56) References Cited

U.S. PATENT DOCUMENTS

| | | | | |
|---|---|---|---|---|
| 6,037,930 | A * | 3/2000 | Wolfe et al. ................... | 345/174 |
| 2002/0084992 | A1 * | 7/2002 | Agnew ........................... | 345/173 |
| 2004/0095336 | A1 * | 5/2004 | Hong et al. ................... | 345/173 |
| 2005/0275634 | A1 * | 12/2005 | Chi et al. ...................... | 345/173 |
| 2010/0225598 | A1 * | 9/2010 | Shen .............................. | 345/173 |
| 2010/0321214 | A1 * | 12/2010 | Wang et al. .................... | 341/20 |
| 2010/0328249 | A1 * | 12/2010 | Ningrat et al. ................ | 345/174 |

* cited by examiner

*Primary Examiner* — Chanh Nguyen
*Assistant Examiner* — John Kirkpatrick
(74) *Attorney, Agent, or Firm* — Jianq Chyun IP Office

(57) ABSTRACT

A resistive touch control device and driving methods and a driving controller thereof are provided to switch operation modes of a touch panel. Depending on the user's requirement, the touch panel can be operated in multi-touch mode or only in an analog mode with high resolution. In other words, the touch control device can be operated in a digital mode, the analog mode, or a hybrid mode including both of the digital and the analog modes.

14 Claims, 12 Drawing Sheets

RESISTIVE TOUCH CONTROL DEVICE AND DRIVING METHOD AND DRIVING CONTROLLER THEREOF

CROSS-REFERENCE TO RELATED APPLICATION

This application claims the priority benefit of Taiwan application serial no. 98102561, filed on Jan. 22, 2009. The entirety of the above-mentioned patent application is hereby incorporated by reference herein and made a part of specification.

BACKGROUND OF THE INVENTION

1. Field of the Invention

The present invention relates to a driving controller of a touch panel. More particularly, the present invention relates to a driving controller capable of switching a touch panel to a digital mode and/or an analog mode, and a driving method thereof.

2. Description of Related Art

With quick development and widespread application of information technology, wireless mobile communication and information home appliance, touch panels have been applied in many information products to serve as input devices for replacing the traditional input devices (for example, keyboards and mice), so as to improve portability and humanity of these produces, and reduce sizes thereof.

Presently, touch panels are generally categorized into resistive touch panels, capacitive touch panels, optical touch panels, acoustic wave touch panels, and electromagnetic touch panels, etc., wherein the resistive touch panel and the capacitive touch panel are commonly used products. Regarding the capacitive touch panel, a multi-touch characteristic thereof can provide a more humanistic operation mode, so that the capacitive touch panel gradually becomes popular in the market. However, a conductive medium has to be applied for touching the capacitive touch panel so as to perform operations. Therefore, the capacitive touch panel cannot be operated by a glove-covered finger or a non-conductive medium.

Regarding the resistive touch panel, the touch panel can be operated by any medium, so that a utilization convenience of the touch panel is improved. Moreover, cost of the resistive touch panel is relatively low, and the technique of the resistive touch panel is relatively mature, so that a market share thereof is relatively high. Generally, the resistive touch panel has two types (analog and digital) of circuit design and corresponding calculation methods. The analog resistive touch panel has a high positioning resolution capability, which is adapted to an operation mode of handwriting input. Regarding the digital resistive touch panel, sensing blocks with different sizes can be fabricated according to customer's requirements, and it can be widely applied in customized products due to the multi-touch function thereof.

SUMMARY OF THE INVENTION

The present invention is directed to a touch control device including a touch panel and a driving controller. The touch panel includes two transparent substrates disposed in parallel and a plurality of transparent conductive patterns disposed on the two transparent substrates, wherein each of the transparent conductive patterns has two conductive electrodes located at opposite sides of the touch panel and a plurality of sensing blocks formed according to the transparent conductive patterns. The driving controller is used for setting the touch control device to a digital mode, an analog mode or a hybrid mode including both of the digital and the analog modes.

The present invention is directed to a plurality of driving controllers and driving methods adapted to the aforementioned touch panel, by which operation modes of the touch panel can be switched.

In an embodiment of the present invention, when the driving controller is operated in the digital mode, the driving controller correspondingly outputs a matrix data, and when the driving controller is operated in the analog mode, the driving controller correspondingly outputs touch coordinates.

In an embodiment of the present invention, the driving controller includes a digital control circuit and an analog control circuit. The digital control circuit scans the conductive electrodes to determine the touched sensing blocks according to electric signals detected from the conductive electrodes. The analog control circuit detects the electric signals of the conductive electrodes to calculate a touched position on the touch panel.

In an embodiment of the present invention, the aforementioned switch circuit includes a plurality of switch groups, and each of the switch groups at least has a plurality of first multiplexers, wherein the first multiplexers of each of the switch groups are respectively coupled to electrodes located at a same side of the touch panel. The first multiplexers couples the electrodes to the digital control circuit or the analog control circuit according to a control signal, wherein when the driving controller is operated in the digital mode, the first multiplexers are respectively coupled to the digital control circuit, and when the driving controller is operated in the analog mode, the first multiplexers in each of the switch groups are mutually shorted and coupled to the analog control circuit.

In an embodiment of the present invention, the switch circuit further includes a selection circuit coupled between the switch group and the analog control circuit, and the selection circuit includes a plurality of second multiplexers, wherein when the driving controller is operated in the analog mode, each of the second multiplexers couples the corresponding first multiplexer to the analog control circuit according to the matrix data.

The present invention provides a plurality of driving methods for the aforementioned touch control device, and one of the driving methods includes following steps. First, a control signal is provided to determine whether the touch control device is operated in a digital mode or an analog mode. Next, if the control signal corresponds to the digital mode, touched sensing blocks in a touch panel are scanned and detected, and if the control signal corresponds to the analog mode, a touched position in the touch panel is detected and calculated. Other driving methods are described in detail with reference of embodiments.

According to a same spirit of the present invention, a plurality of the driving controllers and a plurality of the driving methods are provided for the touch panel, by which not only the operation modes of the touch panel can be automatically switched, but also the touch panel can be operated in the digital mode of multi-touch or the analog mode having a high resolution according to a requirement of a user. Moreover, a multi-touch mode with high resolution can be achieved by combining the digital mode and the analog mode.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

A main object of the present invention is to switch a touch panel to different operation modes. In the following content, technique features of the present invention and functions to be achieved by the present invention are described in detail for those skilled in the art.

Figure 1:
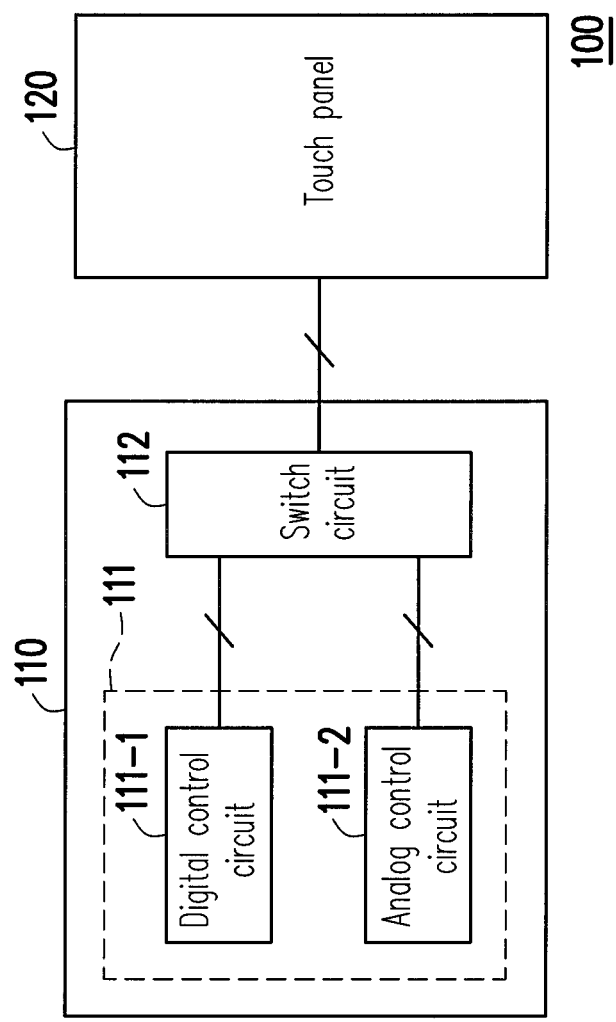
FIG. 1 is a diagram illustrating a touch control device 100 according to a first embodiment of the present invention.

FIG. 1 is a diagram illustrating a touch control device according to a first embodiment of the present invention. Referring to FIG. 1, the touch control device 100 includes a driving controller 110 and a touch panel 120, wherein the driving controller 110 includes a control module 111 and a switch circuit 112. The control module 111 further includes a digital control circuit 111-1 and an analog control circuit 111-2, wherein the digital control circuit 111-1 and the analog control circuit 11102 are respectively coupled to the touch panel 120 through the switch circuit 112.

Figure 2A:
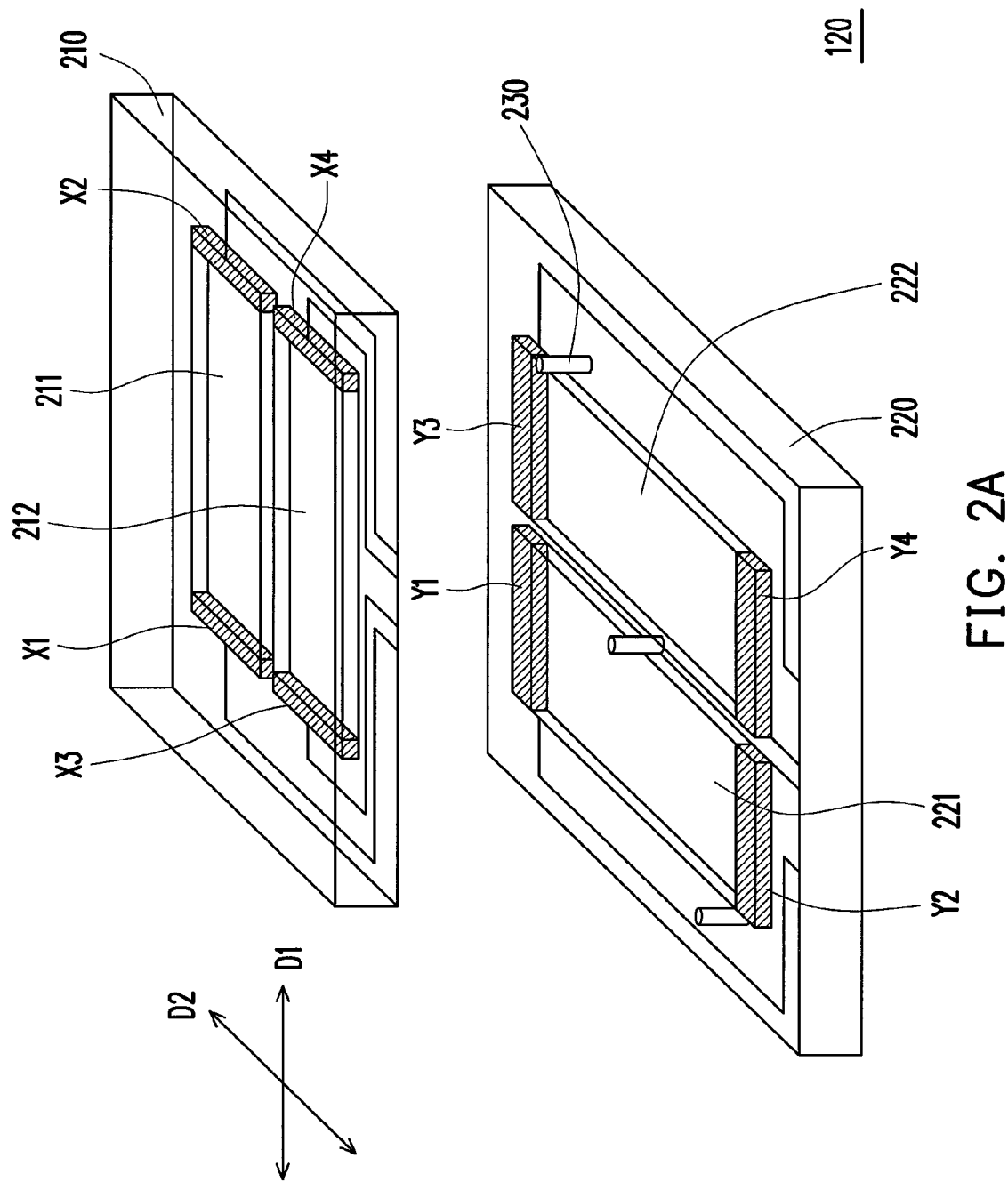
FIG. 2A is an exploded view of a touch panel 120.
Figure 2B:
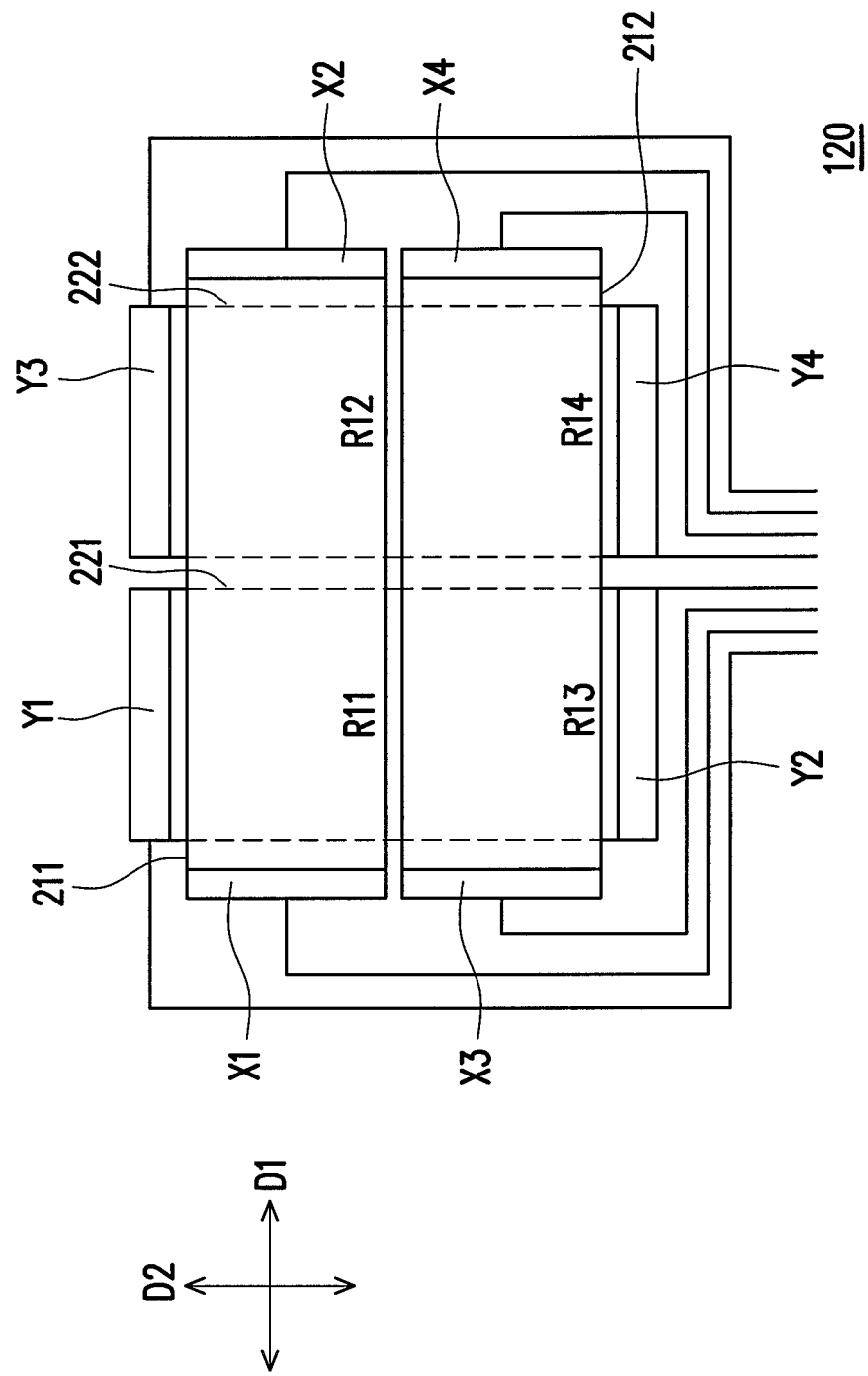
FIG. 2B is a top view of a touch panel 120.

Referring to FIG. 2A and FIG. 2B for detailed descriptions of the touch panel 120 of the present embodiment. FIG. 2A is an exploded view of the touch panel 120, and FIG. 2B is a top view of the touch panel 120. Referring to FIG. 2A first, the touch panel 120 includes transparent substrates 210 and 220, a plurality of transparent conductive patterns 211, 212, 221 and 222, a plurality of conductive electrodes X1~X4 and Y1~Y4, and a plurality of spacers 230. The transparent conductive patterns 211 and 212 are disposed on the transparent substrate 210. The transparent conductive patterns 211 and 212 are extended along a first direction D1, and the two adjacent transparent conductive patterns 211 and 212 are mutually parallel. The conductive electrodes X1 and X2 are disposed on the transparent conductive pattern 211 at two ends along the first direction D1, and the conductive electrodes X3 and X4 are disposed on the transparent conductive pattern 212 at two ends along the first direction D1.

The transparent conductive patterns 221 and 222 are disposed on the transparent substrate 220. The transparent conductive patterns 221 and 222 are extended along a second direction D2, and are mutually parallel. Wherein, the first direction D1 and the second direction D2 are intersected. The conductive electrodes Y1 and Y2 are disposed on the transparent conductive pattern 221 at two ends along the second direction D2, and the conductive electrodes Y3 and Y4 are disposed on the transparent conductive pattern 222 at two ends along the second direction D2. The spacers 230 are disposed between the transparent conductive patterns 211 and 212 and the transparent conductive patterns 221 and 222. The transparent conductive patterns 211 and 212 and the transparent conductive patterns 221 and 222 are substantially located between the transparent substrates 210 and 220.

Moreover, referring to FIG. 2B again, the touch panel 120 includes the transparent conductive patterns 211, 212, 221 and 222, wherein the conductive electrodes X1 and X2 are disposed at two ends of the transparent conductive pattern 211, the conductive electrodes X3 and X4 are disposed at two ends of the transparent conductive pattern 212, and the transparent conductive patterns 211 and 212 are extended along the first direction D1. Moreover, the conductive electrodes Y1 and Y2 are disposed at two ends of the transparent conductive pattern 221, the conductive electrodes Y3 and Y4 are disposed at two ends of the transparent conductive pattern 222, and the transparent conductive patterns 221 and 222 are extended along the second direction D2. The transparent conductive patterns 211, 212, 221 and 222 are, for example, a layer of indium tin oxide (ITO) thin film electrode.

The first direction D1 is substantially perpendicular to the second direction D2. Namely, an extending direction of the transparent conductive patterns 211 and 212 is perpendicular to that of the transparent conductive patterns 221 and 222. Therefore, the transparent conductive patterns 211 and 212 are partially overlapped to the transparent conductive patterns 221 and 222 in space, so as to form sensing blocks R11~R14. In detail, the corresponding overlapped portion of the transparent conductive pattern 211 and the transparent conductive pattern 221 in the space forms the sensing block R11 of FIG. 2B, the corresponding overlapped portion of the transparent conductive pattern 211 and the transparent conductive pattern 222 in the space forms the sensing block R12 of FIG. 2B, the corresponding overlapped portion of the transparent conductive pattern 212 and the transparent conductive pattern 221 in the space forms the sensing block R13 of FIG. 2B, and the corresponding overlapped portion of the transparent conductive pattern 212 and the transparent conductive pattern 222 in the space forms the sensing block R14 of FIG. 2B.

First Embodiment

In the first embodiment, before the touch control device 100 is used, the user can select to switch the touch control device 100 to a digital mode or an analog mode according to an actual requirement. Then, the control module 111 sends a control signal (not shown) to the switch circuit 112 according to the user's selection, so that the switch circuit 112 can couple the touch panel 120 to the digital control circuit 111-1 or the analog control circuit 111-2 according to the control signal sent from the control module 111, and therefore the touch control device 100 can be operated in the digital mode or the analog mode. In other words, based on the switch circuit 112, the user can select to determine the touched sensing blocks of the touch panel 120 through the digital control circuit 111-1 or to obtain the touch coordinates (i.e. a touched position) through the analog control circuit 112-2.

Figure 3:
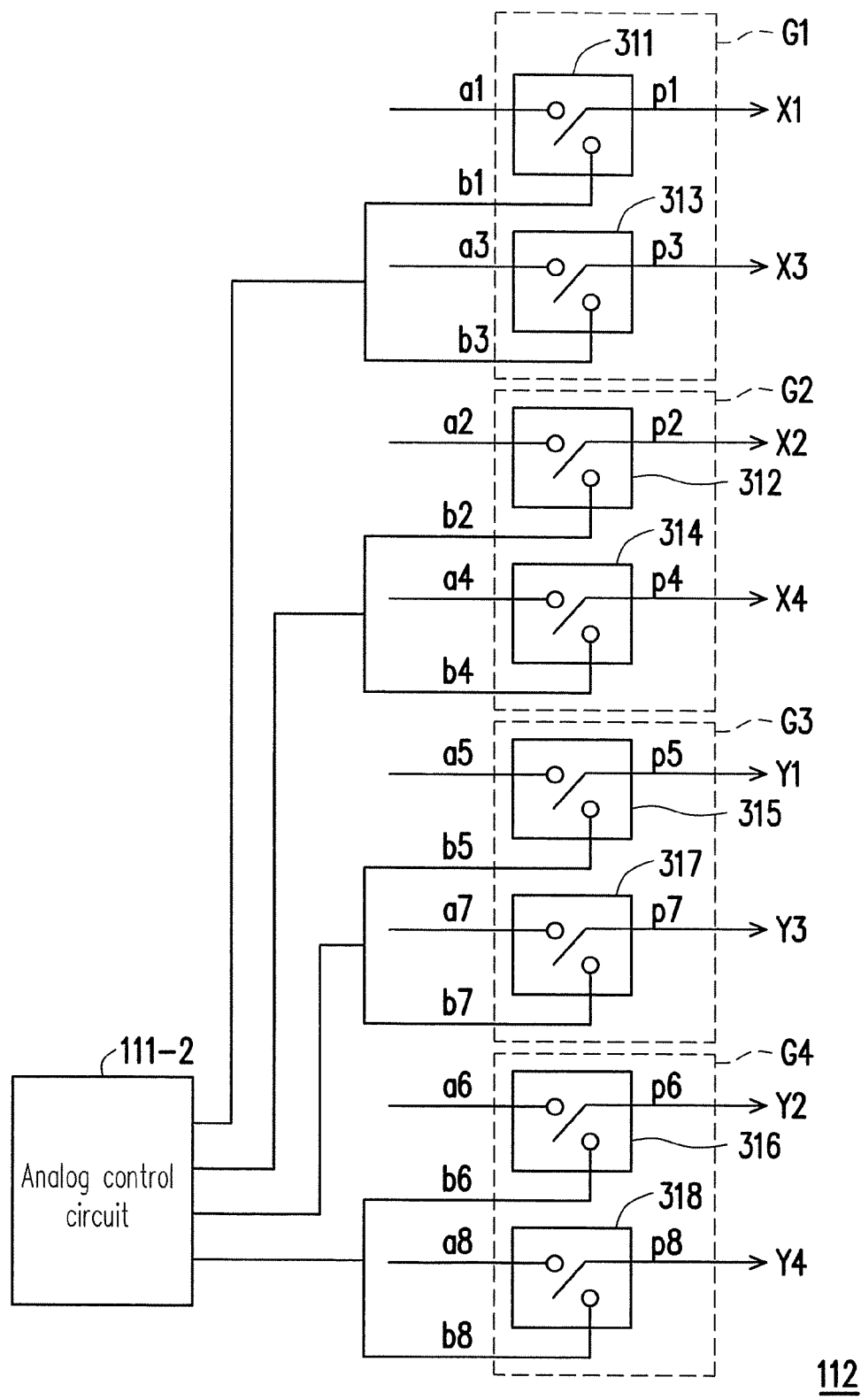
FIG. 3 is a schematic diagram illustrating a switch circuit 112 according to a first embodiment of the present invention.

To fully describe that how the switch circuit 112 switches such two operation modes, please refer to FIGS. 1~3. FIG. 3 is a schematic diagram illustrating the switch circuit 112 according to the first embodiment of the present invention. The switching circuit 112 includes a plurality of multiplexers 311~318. The multiplexers 311~318 respectively have signal terminals p1~p8, first mode terminals a1~a8 and second mode terminals b1~b8, and the multiplexers 311~318 are controlled by the control signal sent from the control module 111. Wherein, the signal terminals p1~p8 are respectively coupled to the conductive electrodes X1~X4 and Y1~Y4 of the touch panel 120. In the first embodiment, the multiplexers coupled to the conductive electrodes that are located at a same side of the touch panel 120 are regarded to belong to a same switch group. For example, the multiplexers 311 and 313 belong to a same switch group G1, the multiplexers 312 and 314 belong to a same switch group G2, the multiplexers 315 and 317 belong to a same switch group G3, and the multiplexers 316 and 318 belong to a same switch group G4.

In the first embodiment, the switch groups (for example, the switch group G1 and the switch group G3) coupled to the digital control circuit 111-1 correspond to different transparent conductive patterns of the touch panel 120. In other words, the first mode terminals a1~a8 of the multiplexers 311, 313, 315 and 317 are coupled to the digital control circuit 111-1. Moreover, the second mode terminals b1~b8 of the multiplexers in the same switch group are mutually shorted. For example, the second mode terminals b1 and b3 are shorted, the second mode terminals b2 and b4 are shorted, and the short circuit of the second mode terminals b5~b8 can be deduced by analogy. The second mode terminals b1~b8 are further coupled to the analog control circuit 111-2.

Accordingly, the multiplexers 311~318 determines to couple the signal terminals p1~p8 to the first mode terminals a1~a8 or the second mode terminals b1~b8 according to the control signal sent from the control module 111, so as to switch the operation modes of the touch control device 100. When the touch control device is operated in the digital mode, the digital control circuit 111-1 can fully scan the touch panel 120 through the conductive electrodes X1, X3, Y1 and Y3, so that when the user touches the touch panel 120, current variations or voltage variations of the touched sensing blocks can be detected. Now, the digital control circuit 111-1, for example, defines the touched sensing blocks via digital signals, and the corresponding current variation or the voltage variation is generated when a different sensing block is touched.

For example, when the sensing block R12 is touched, the overlapped transparent conductive patterns 222 and 211 are conducted, and when the digital control circuit 111-1 provides the scan signal to the conductive electrodes Y1 and Y3, the digital control circuit 111-1 can detect the voltage or the current variation through the conductive electrode X1. Similarly, when the sensing block R13 is simultaneously touched, the digital control circuit 111-1 can detect the voltage or the current variation through the conductive electrode X3, so as to output the matrix data, which corresponds to the transparent conductive patterns 222 and 221 forming the sensing blocks. Accordingly, the touch control device 100 can simultaneously sense a plurality of the sensing blocks, so as to achieve the multi-touch function.

In the first embodiment, the overlapped portions of the transparent conductive patterns 221, 222, 211 and 212 totally form four sensing blocks R11, R12, R13 and R14, so that the touch control device 100 can simultaneously sense four sensing blocks at most. Certainly, if a number of the sensing blocks is increased (i.e. a number of the transparent conductive patterns is increased), the touch control device 100 can sense more sensing blocks. Namely, the aforementioned transparent conductive patterns of a 2×2 array are only used as an example, and an actual design is not limited thereto, which can also be transparent conductive patterns of an N×N array, wherein N is a positive integer.

On the other hand, when the touch control device 100 is operated in the analog mode, since a part of the second mode terminals b1~b8 of the multiplexers of the same switch group are mutually shorted before being connected to the analog control circuit 111-2, the touch panel 120 can be equivalent to a conventional resistive touch panel, so that the analog control circuit 111-2 can detect electric signals of the touch panel 120, and perform calculations to position the touch coordinates, so as to output coordinates data. However, the present invention does not put emphasis upon such positioning technique, and such positioning technique should be known by those skilled in the art, and therefore detailed descriptions thereof are not repeated.

Figure 4:
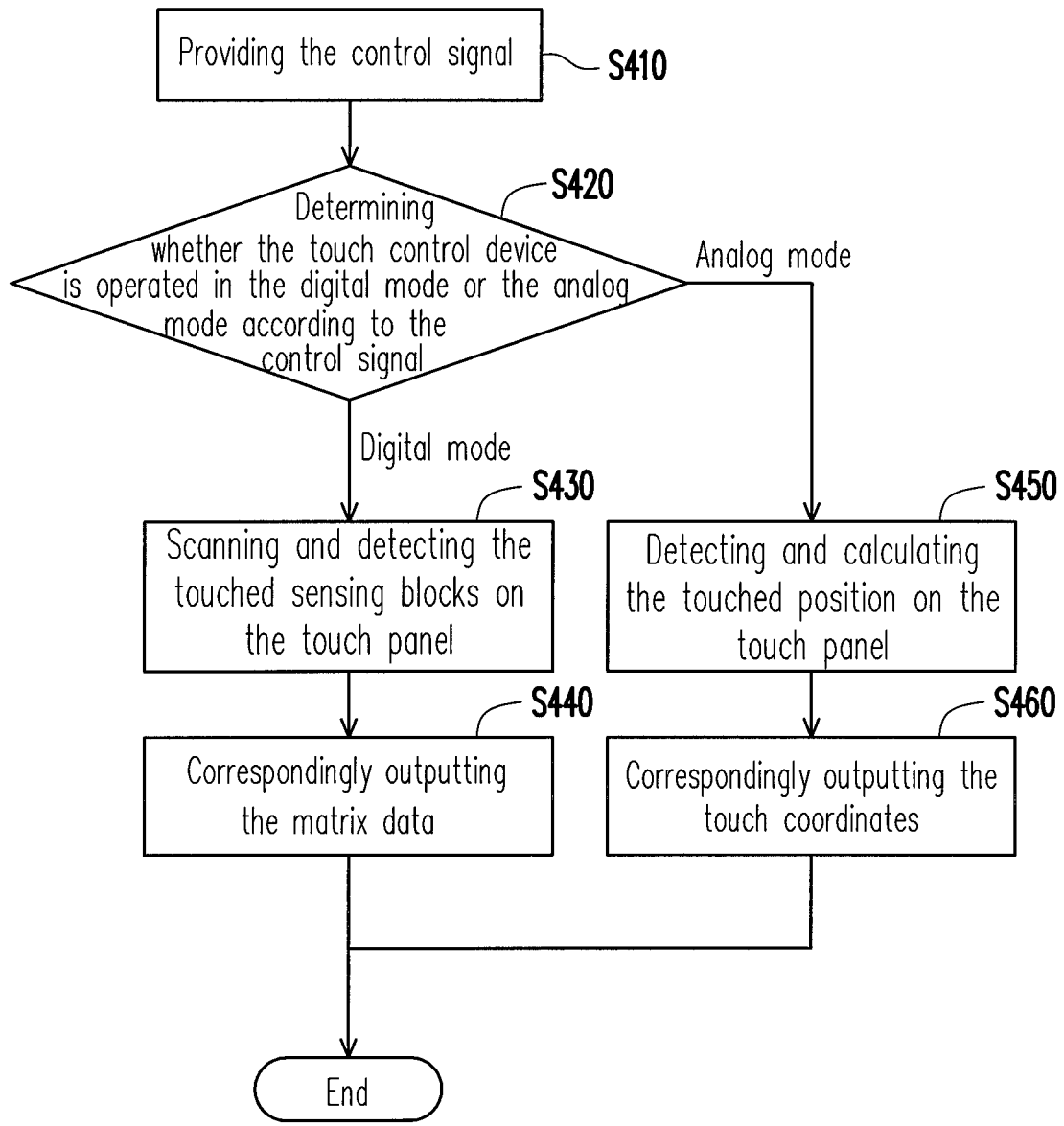
FIG. 4 is a flowchart illustrating a switching method of a touch control device 100 according to a first embodiment of the present invention.

According to the aforementioned description, a method for driving the touch control device 100 is provided for those skilled in the art. FIG. 4 is a flowchart illustrating a method for switching operation modes of the touch control device 100 according to the first embodiment of the present invention. Referring to FIG. 4, a method for switching the operation modes of the touch control device 100 includes following steps. First, the control signal is provided (step S410). Next, determining whether the touch control device 110 is operated in the digital mode or the analog mode according to the control signal (step S420). If the control signal corresponds to the digital mode, the touched sensing blocks on the touch panel are scanned and detected (step S430), and if the control signal corresponds to the analog mode, the touched position on the touch panel is detected and calculated (step S450).

Moreover, after the step S430 is executed, the matrix data can be correspondingly output (step S440), and after the step S450 is executed, the touch coordinates can be correspondingly output (step S460).

According to the above descriptions, the user can determine the operation mode of the touch control device 100 according to an actual requirement, and if the multi-touch function is required, the touch control device 100 can be switched to the digital mode through the switch circuit 112, while if the high-resolution positioning is required, the touch control device 100 is then switched to the analog mode.

Second Embodiment

Figure 5:
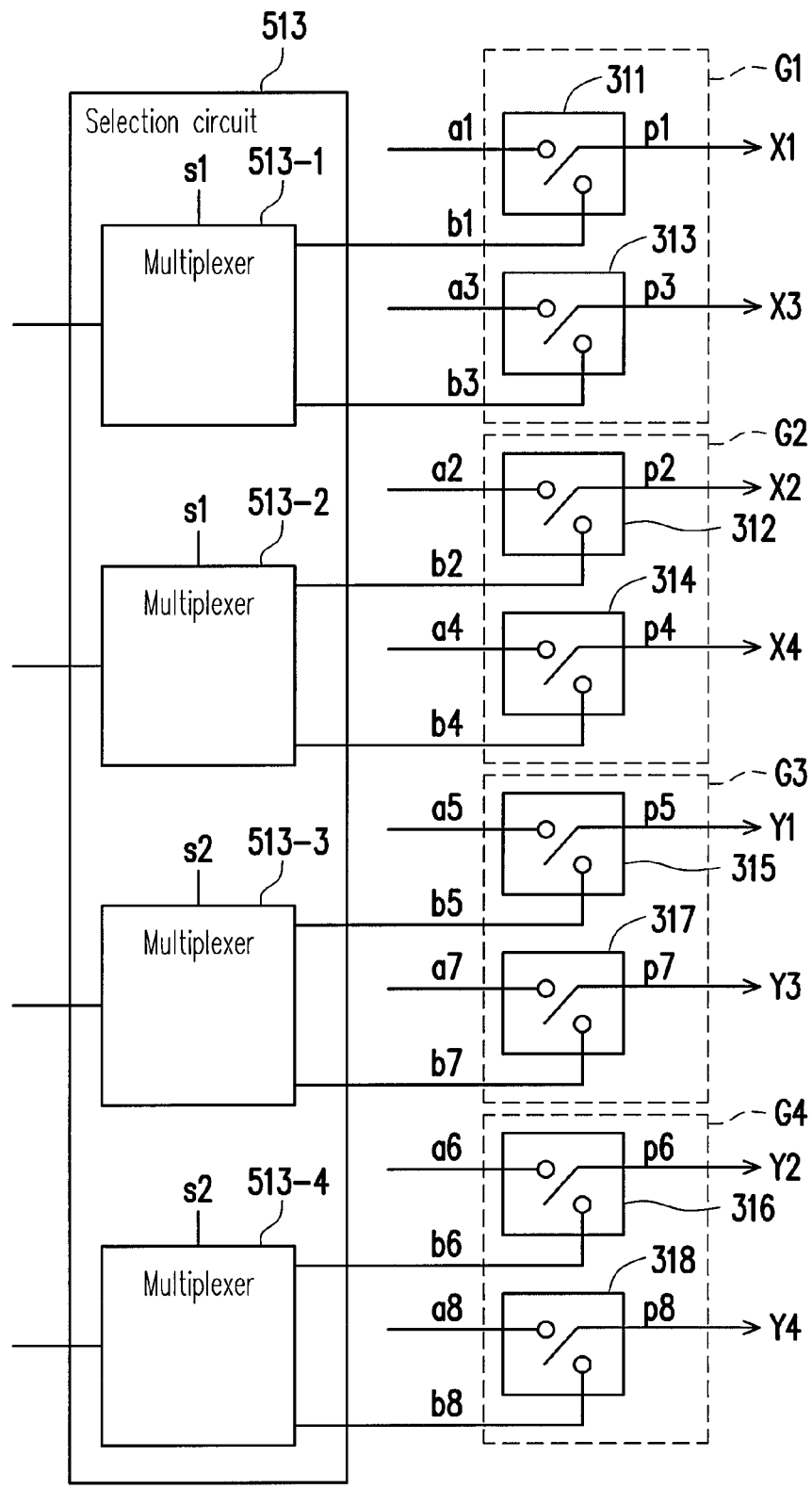
FIG. 5 is a schematic diagram illustrating a switch circuit 112 according to a second embodiment of the present invention.

The present invention further provides another switch circuit to achieve a different switching method. FIG. 5 is a schematic diagram illustrating a switch circuit 112 according to the second embodiment of the present invention. Referring to FIG. 1 and FIG. 5, the switch circuit 112 includes the switch group G1~G4 and a selection circuit 513. The switch groups G1~G4 includes a plurality of multiplexers 311~318, and the selection circuit 513 includes a plurality of multiplexers 513-1~513-4.

Similarly, the signal terminals of the multiplexers of the same switch group are coupled to the conductive electrodes located at a same side of the touch panel 120, and the switch groups (for example, the switch group G1 and the switch group G3) corresponding to different transparent conductive patterns of the touch panel 120 are coupled to the digital control circuit 111-1. In other words, the first mode terminals a1, a3, a5 and a7 of the multiplexers 311, 313, 315 and 317 are coupled to the digital control circuit 111-1. Moreover, the second mode terminals b1~b8 of the multiplexers 311-318 are coupled to the analog control circuit 111-2 through the multiplexers 513-1~513-4.

In detail, the second mode terminals of the multiplexers of the same group are respectively coupled to first data terminals of the multiplexers 513-1~513-4. For example, the second mode terminals b1 and b3 are coupled to the analog control circuit 111-2 through the multiplexer 513-1, the second mode terminals b2 and b4 are coupled to the analog control circuit 111-2 through the multiplexer 513-2, the second mode terminals b5 and b7 are coupled to the analog control circuit 111-2 through the multiplexer 513-3, and the second mode terminals b6 and b8 are coupled to the analog control circuit 111-2 through the multiplexer 513-4. Wherein, the multiplexers 513-1~513-4 are controlled by the matrix data output by the digital control circuit 111-1.

Further, the touch control device 100 is first operated in the digital mode, and now the signal terminals p1~p8 of the multiplexers 311~318 are coupled to the first mode terminals a1~a8, so that the digital control circuit 111-1 first scans the touch panel 120 to find the touched sensing blocks, and outputs a matrix data (s1, s2) corresponding to the touched sensing blocks. As described above, the overlapped portion of two transparent conductive patterns is the sensing block, and the matrix data (s1, s2) can be used to record a relative position of the two transparent conductive patterns in the touch panel 120. Next, the digital control circuit 111-1 sends the control signal (not shown) to the switch circuit 112 to switch the touch control device 100 to the analog mode. Namely, the switch circuit 112 couples the signal terminals p1~p8 to the second mode terminals b1~b8.

Thereafter, the selection circuit 513 further selects the conductive electrodes to be coupled to the analog control circuit 111-2 according to the matrix data (s1, s2). Therefore, the analog control circuit 111-2 can obtain the touch coordinates and store the touch coordinates to a buffer corresponding to the matrix data (s1, s2).

For example, when the user touches the sensing block R12 of the touch panel 120, the digital control circuit 111-1 scans and detects the sensing block R12 and outputs the matrix data (s1, s2), wherein the matrix data (s1, s2) corresponds to the transparent conductive patterns 211 and 222. Thereafter, the switch circuit 112 couples the touch panel 120 to the analog control circuit 111-2 according to the control signal output by the control circuit 111-1.

Wherein, the multiplexers 513-1 and 513-2 couples the conductive electrodes X1 and X2 located at two ends of the transparent conductive patterns 211 to the analog control circuit 111-2 according to the matrix element s1 in the matrix data (s1, s2). Namely, the second mode terminals b1 and b2 are coupled to the analog control circuit 111-2. Similarly, the multiplexers 513-3 and 513-4 couples the second mode terminals b7 and b8 to the analog control circuit 111-2 according to the matrix element s2 in the matrix data (s1, s2). Namely, the conductive electrodes Y1 and Y2 located at two ends of the transparent conductive patterns 222 are coupled to the analog control circuit 111-2.

Finally, the analog control circuit 111-2 can scan and calculate the touch coordinates of the sensing block R12, and store the touch coordinates in the buffer corresponding to the matrix data (s1, s2). Similarly, in the present embodiment, each time when the digital control circuit 111-1 detects a touch event, the analog control circuit 111-2 is switched to position touched points of the touched sensing blocks, so as to achieve the high-resolution multi-touch function.

Figure 6:
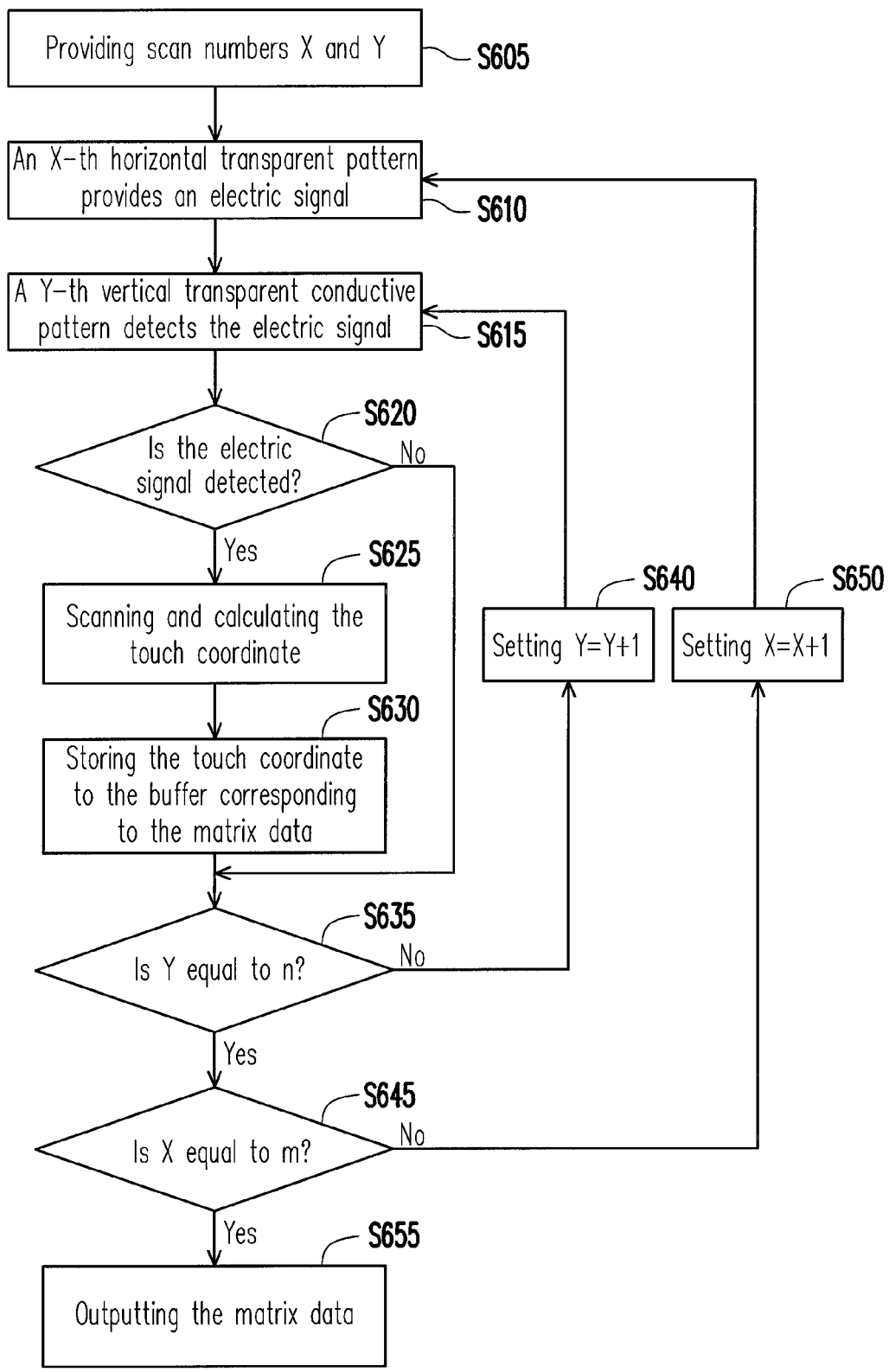
FIG. 6 is a flowchart illustrating a driving method of a touch control device 100 according to a second embodiment of the present invention.

According to the aforementioned descriptions of the second embodiment, another method for driving the touch control device 100 is provided below for those skilled in the art. FIG. 6 is a flowchart illustrating a method for switching the operation modes of the touch control device 100 according to the second embodiment of the present invention. Referring to FIG. 6, the method for switching the operation modes of the touch control device 100 includes following steps. First, scan numbers X and Y are provided (step S605), wherein X=1, and Y=1. In the present embodiment, the touch panel 120 has m horizontal transparent conductive patterns and n vertical transparent conductive patterns, wherein the horizontal transparent patterns are extended along the first direction D1, and the vertical transparent conductive patterns are extended along the second direction D2, and the first direction is, for example, perpendicular to the second direction, though the present invention is not limited thereto.

Next, an X-th horizontal transparent pattern provides an electric signal (step S610), wherein the electric signal is, for example, the voltage variation or the current variation, though the present invention is not limited thereto. Moreover, to ensure that the touch control device is operated in the digital mode, the control signal can be first output to switch the touch control device to the digital mode. When the control signal corresponds to the digital mode, a Y-th vertical transparent conductive pattern detects the electric signal (step S615). Next, it is determined whether the electric signal is detected (step S620), and if the electric signal is detected, it represents that there is a touch event.

When the electric signal is detected, the touch coordinates are detected and calculated (step S625). It should be noted that it is an operation of the analog mode, so that the control signal is first output to switch the touch control device to the analog mode. Next, the touch coordinates are stored to the buffer corresponding to the matrix data (step S630), wherein such matrix data corresponds to the X-th horizontal transparent conductive pattern and the Y-th vertical transparent conductive pattern.

Conversely, if the electric signal is not detected, the steps S625 and S630 are skipped, and a next step is directly executed to determine whether Y is equal to n (step S635), namely, it is determined whether all of the vertical transparent conductive patterns are scanned, and if Y is not equal to n, Y=Y+1 is set (step S640), so as to scan a next vertical transparent conductive pattern, and then the step S615 is repeated. If Y is equal to n, it represents that all of the vertical transparent conductive patterns are scanned. Then, whether X is equal to m is determined (step S645), similarly, it is determined whether all of the horizontal transparent conductive patterns have provided the electric signals, and if X is not equal to m, X=X+1 is set (step S650), so that a next horizontal transparent conductive pattern can provide the electric signal, and then the step S610 is repeated.

If X is equal to m, it represents that the touch panel 120 is totally scanned once, so that the matrix data is output (step S655), wherein such matrix data contains the aforementioned matrix data. In other words, when the touch panel 120 is scanned once, all of the touched positions are detected, so that the touch control device 100 can implement the multi-touch function.

Third Embodiment

Figure 7:
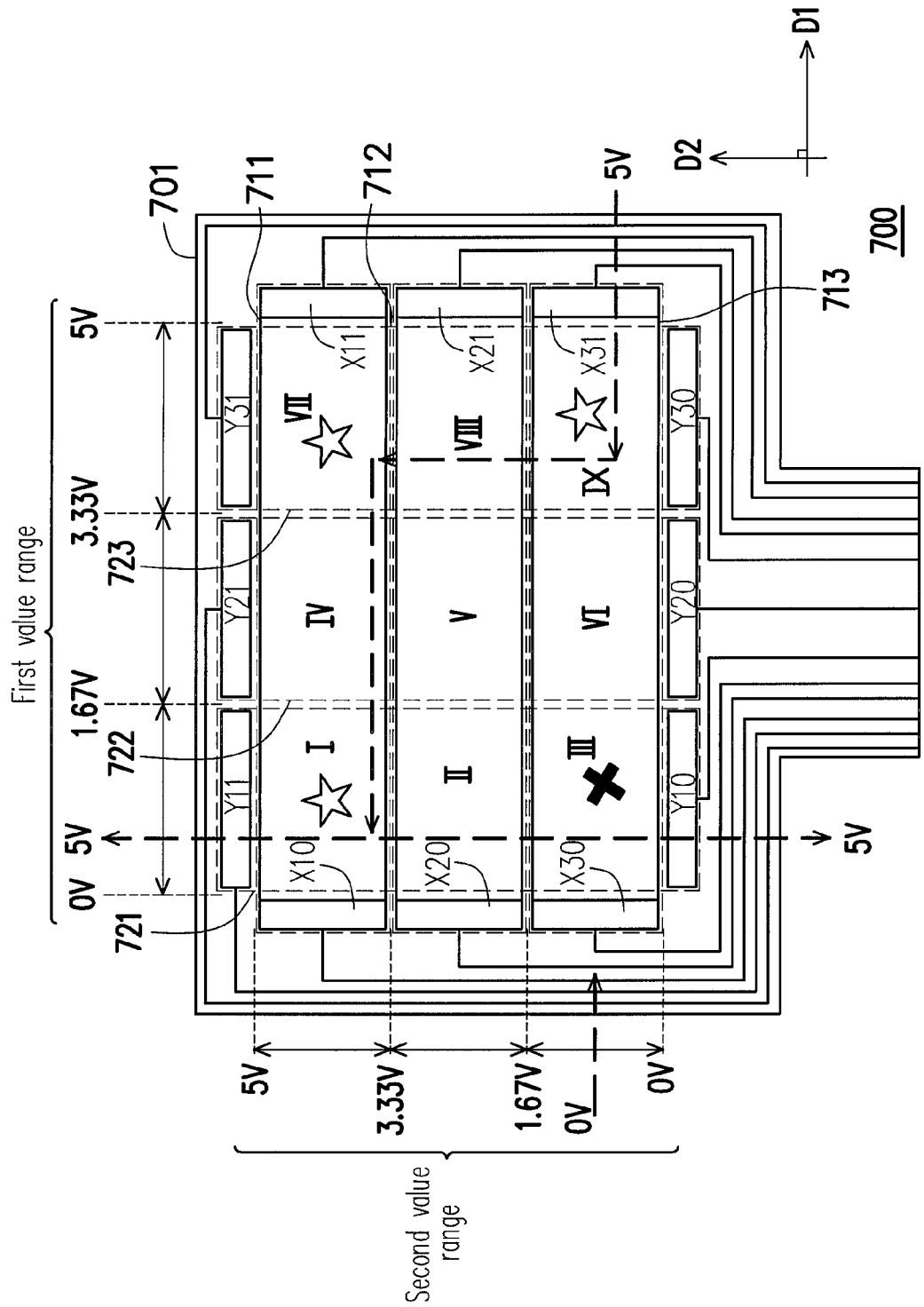
FIG. 7 is a top view of a touch panel 700 according to a third embodiment of the present invention.

The transparent conductive patterns of a 3×3 array are taken as an example. FIG. 7 is a top view of a touch panel 700. Conducive patterns 711, 712, 713 are disposed on a transparent substrate 701, and are respectively extended along the direction D1 in parallel. Two ends of the conductive pattern 711 are coupled to conductive electrodes X10 and X11, two ends of the conductive pattern 712 are coupled to conductive electrodes X20 and X21, and two ends of the conductive pattern 713 are coupled to conductive electrodes X30 and X31. On the other hand, conductive patterns 721, 722, 723 are disposed on another transparent substrate (not shown), and are respectively extended along the direction D2 in parallel. Two ends of the conductive pattern 721 are coupled to conductive electrodes Y10 and Y11, two ends of the conductive pattern 722 are coupled to conductive electrodes Y20 and Y21, and two ends of the conductive pattern 723 are coupled to conductive electrodes Y30 and Y31. The direction D1 can be perpendicular to the direction D2.

Overlapped portions of the conductive patterns 711~713 and the conductive patterns 721~731 are defined as the sensing blocks, and in FIG. 7, nine sensing blocks are defined, which are respectively numbered as I~IX. The conductive patterns 711~723 are preferably linear patterns, and a width range thereof is, for example, between 0.8 to 2 cm, and an area of each of the sensing blocks is between 0.64 $cm^2$ to 4 $cm^2$.

The electrodes located at two ends of each of the conductive patterns are electrically connected to a driving chip (not shown) through lead wires, so as to receive digital signals or analog signals from the driving chip. Wherein, the driving chip can selectively include the digital control circuit 111-1, the analog control circuit 111-2, and the switch circuit 112 of FIG. 1. By such means, only one of the digital mode or the analog mode can be activated, or a hybrid mode including both of the digital and the analog modes can be achieved.

The aforementioned touch panel can be driven according to a plurality of driving methods, which can be alone a digital driving or an analog driving, or can be first the digital driving and then the analog driving, which are respectively described as follows.

Figure 8A:
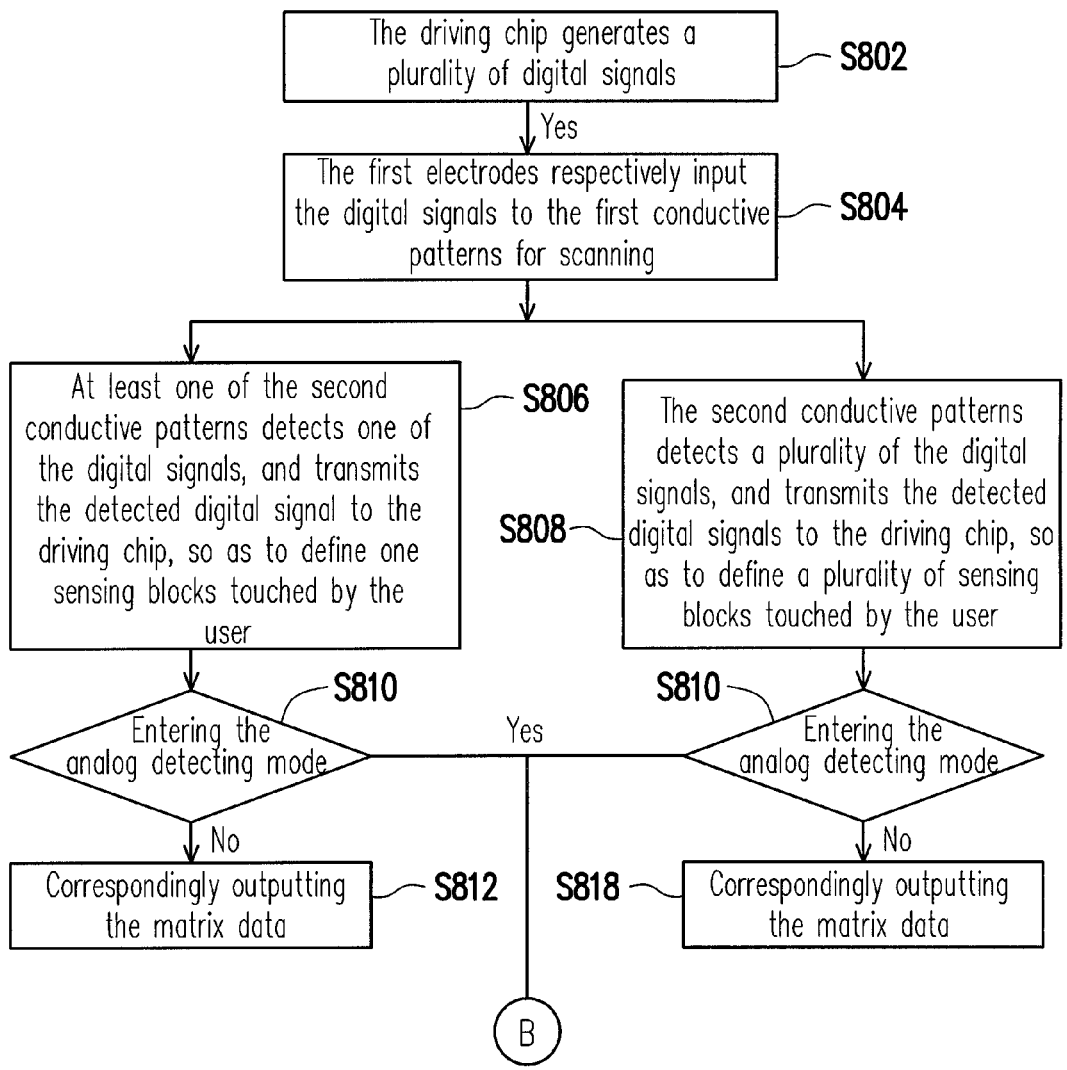
FIG. 8A is a flowchart illustrating a digital driving method according to a third embodiment of the present invention.

Referring to FIG. 8A, FIG. 8A is a flowchart illustrating a digital driving method according to the third embodiment of the present invention. The digital driving method includes following steps. First, the driving chip (not shown) generates a plurality of digital signals (step S802). Next, the digital signals are respectively input to the first conductive patterns 711, 712 and 713 through the first electrodes X10~X31 for scanning (step S804). Next, at least one of the second conductive patterns 721, 722 and 723 detects the digital signals input to the first conductive patterns 711, 712 and 713, and transmits the detected digital signal back to the driving chip, so as to define one or a plurality of sensing blocks touched by the user at a same time (step S806 or step S808). Finally, a matrix data corresponding to the detected sensing blocks is output to represent the touched position (step S812). Namely, when the sensing blocks I and VIII are simultaneously touched, positions of these two sensing blocks can be detected by the second electrodes Y10~Y31, and the matrix data representing the positions of the two sensing blocks is output. On the other hand, the digital signals can also be input to the second conductive patterns 721, 722 and 723 through the second electrodes Y10~Y31, and the first electrodes X10~X31 can detect the digital signals to achieve a same result as above. Since the present example is only set to the operation mode of the digital driving mode, the step S810 is omitted. Moreover, the steps S802~S808 can be regarded as further descriptions of the step S430 of FIG. 4.

Figure 8B:
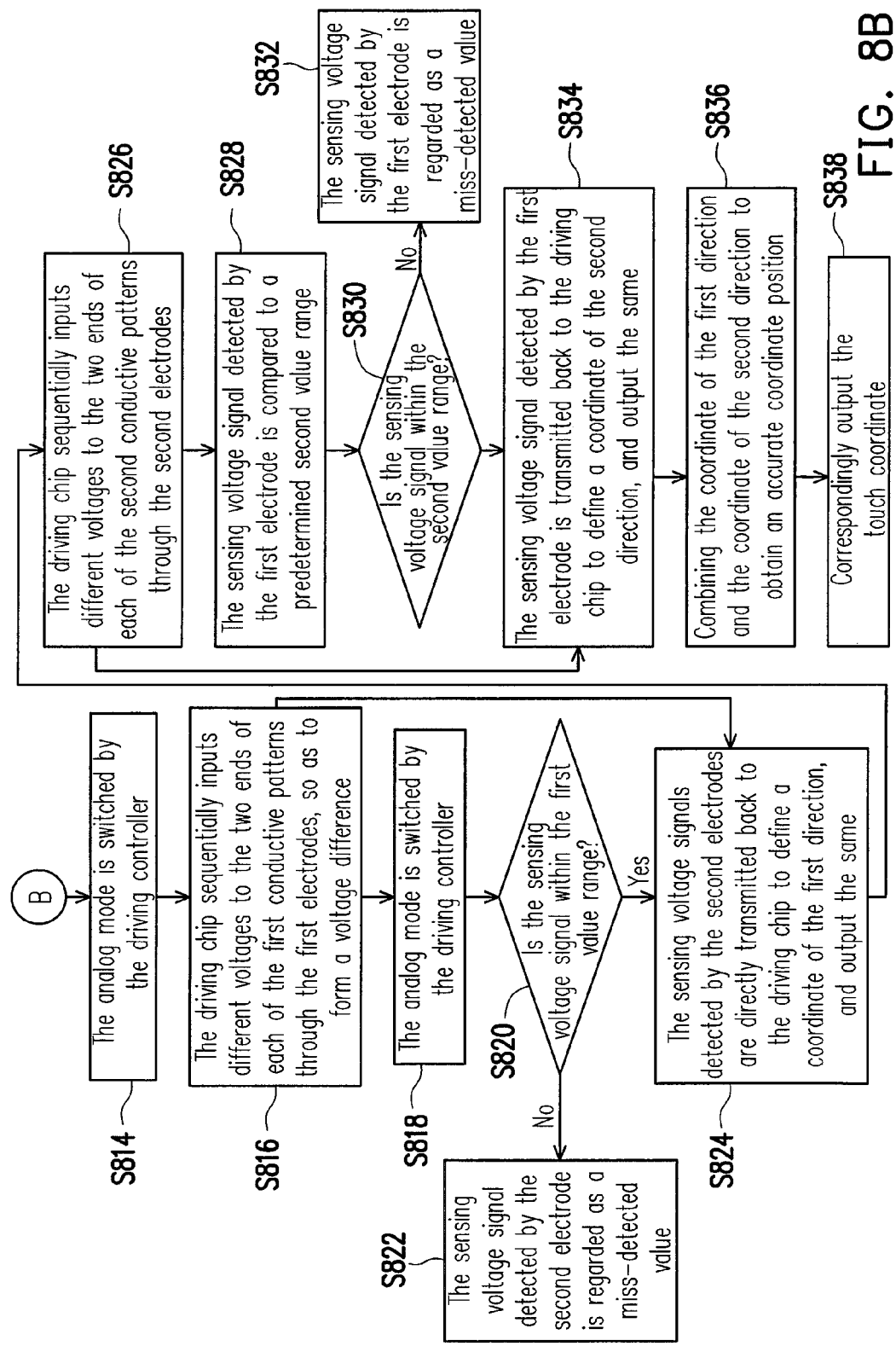
FIG. 8B is a flowchart illustrating an analog driving method according to a third embodiment of the present invention.

Referring to FIG. 8B, FIG. 8B is a flowchart illustrating an analog driving method according to the third embodiment of the present invention. Since the present example is only set to the operation mode of the analog driving mode, the step S814 is omitted. The analog driving method includes following steps. First, the driving chip sequentially inputs different voltages to the two ends of the first conductive patterns 711, 712 and 713 through the first electrodes X10~X31, for example, inputs a 0V (volt) voltage through the first electrodes X10, X20 and X30, and inputs a 5V voltage through the first electrodes X11, X21 and X31, so as to form a 5V voltage difference between the two electrodes of each of the first conductive patterns (step S816). Next, the second electrodes Y10~Y31 at the two ends of the second conductive patterns 721~723 detect one or a plurality of voltage-dividing signals obtained based on calculation of the 5V voltage difference, so as to serve as corresponding one or a plurality of sensing voltage signals. Now, the sensing voltage signals can be directly transmitted back to the driving chip to define one or a plurality of coordinates of the first direction (step S824), or a miss-detection obviating function can be selectively activated, which is described later.

Next, the driving chip sequentially inputs different voltages to the two ends of the second conductive patterns 721, 722 and 723 through the second electrodes Y10~Y31, for example, inputs a 0V voltage through the second electrodes Y10, Y20 and Y30, and inputs a 5V voltage through the second electrodes Y11, Y21 and Y31, so as to form a 5V voltage difference between the two electrodes of each of the second conductive patterns (step S826). Next, the first electrodes X10~X31 located at the two ends of the first conductive patterns 711~713 detect one or a plurality of voltage-dividing signals obtained based on calculation of the 5V voltage difference, so as to serve as the corresponding one or a plurality of sensing voltage signals. Now, the sensing voltage signals can be directly transmitted back to the driving chip to define one or a plurality of coordinates of the second direction (step S834), or the miss-detection obviating function can be selectively activated, which is also described later.

Finally, an accurate coordinates position is obtained according to an intersection of the coordinates of the first direction and the coordinates of the second direction, or a plurality of accurate coordinates positions are obtained according to the intersection of a plurality of the coordinates of the first direction and a plurality of the coordinates of the second direction (step S836). Next, one or a plurality of touch coordinates is output (step S838). By such means, the single or multi touch function can be achieved.

Referring to FIG. 7 again, when the sensing blocks I, VII and IX (marked with stars) are simultaneously touched, the conductive patterns 711 and 713 located on the upper transparent substrate and the conductive patterns 721 and 723 located on the lower transparent substrate are mutually conducted to form a conductive path shown as dot lines of FIG. 7. Now, a following problem is probably generated. The electrode Y10 or the electrode Y11 located at one end of the second conductive pattern 721 can probably detect a scan signal (for example, the 5V voltage) input to the first conductive pattern 713, so that the diving chip can misjudge that the sensing block III (marked with a cross) is touched, and therefore the output matrix data may finally include data of four sensing blocks I, III, VII and IX. Therefore, the sensing block III actually not touched but still having output address information is obviously miss-detected.

To resolve the aforementioned problem, the miss-detection obviating function can be selectively inserted between the steps S816 and S824, which can be described by following steps S818~S822. First, when the second electrode detects one or a plurality of the sensing voltage signals, each of the sensing voltage signal is compared to a predetermined first value range (step S818) to determine whether the sensing voltage signal is within the first value range (step S820). If the sensing voltage signal is within the first value range, the corresponding coordinates of the first direction are output, and if the sensing voltage signal is not within the first value range, the one or the plurality of the sensing voltage signals detected by the second electrode is regarded as a miss-detected value, and is not output.

Similarly, the miss-detection obviating function can also be selectively inserted between the steps S826 and S834. When the first electrode detects one or a plurality of the sensing voltage signals, each of the sensing voltage signals is compared to a predetermined second value range (step S828) to determine whether the sensing voltage signal is within the second value range (step S830). If the sensing voltage signal is within the second value range, the corresponding coordinates of the second direction are output, and if the sensing voltage signal is not within the second value range, the one or the plurality of the sensing voltage signals detected by the first electrodes is regarded as a miss-detected value, and is not output.

Referring to FIG. 7 and FIG. 8B again, the steps S818~S822 can further be described as follows. First, a number of the first conductive patterns extended along the first direction (for example, the direction D1 of FIG. 7) is defined to be $n_t$, wherein $n_t=1, 2, 3, \ldots, n-1, n, n+1, \ldots$, and n is a positive integer. In FIG. 7, the number of the first conductive patterns is $n_t=3$, and n=1, 2, 3 defined from bottom to top (which can also be defined from the top to the bottom). A number of the second conductive patterns extended along the second direction (for example, the direction D2 of FIG. 7) is $m_t$, wherein $m_t=1, 2, 3, \ldots, m-1, m, m+1, \ldots$, and m is a positive integer. In FIG. 7, the number of the first conductive patterns is $m_t=3$, and m=1, 2, 3 defined from left to right (which can also be defined from the right to the left).

A driving method for determining whether there is a miss-detection includes following steps. First, a first voltage V1 is provided to the first electrode located at one end of the n-th first conductive pattern. For example, V1=5V (volts) is provided to the first electrode (X31) located at one end of the first (n=1) first conductive pattern 713. Next, a second voltage V2 is provided to the first electrode located at another end of the same n-th first conductive pattern. For example, V2=0V (volt) is provided to the first electrode (X30) located at the other end of the same first (n=1) first conductive pattern 713. Therefore, the two ends of the first conductive pattern 713 may have a 5V (volts) voltage difference. Then the second conductive patterns 721~723 perform the detections. Assuming at least one of the second electrodes (Y20 and Y21) located at the two ends of the m-th second conductive pattern detects a sensing voltage signal Vs, whether the sensing voltage signal Vs is within the predetermined first value range $[(V1-V2)/mt]*(m-1)<Vs<[(V1-V2)/mt]*m$ is then determined. If the sensing voltage signal Vs is within the first value range, the coordinates of the first direction are then output, and if the sensing voltage signal Vs is not within the first value range, the sensing voltage signal Vs is then regarded as a miss-detected value, and is obviated.

For example, when the sensing blocks I, VII, IX are simultaneously touched, and a touch duration thereof is long enough for the scan signals input from two sides of the touch panel to complete scanning the whole touch panel, a 5V (volts) voltage is, for example, input to the first electrode X31 located at one end of the first (n=1) first conductive pattern 713 and the first electrode X11 located at one end of the third (n=3) first conductive pattern 711, and a 0V (volts) voltage is input to the first electrodes X10 and X30. Now, the first (m=1) second conductive pattern 721 can detect two 5V (volts) voltages (or voltages less than and closed to 5V) respectively input through the first electrodes X11 and X31 located at one ends of the first conductive patterns 711 and 713, the two voltages respectively correspond to the sensing blocks I and III. The sensing block III can be miss-detected due to existence of the conductive path shown as the dot lines of FIG. 7.

Now, the first value range detected by the first (m=1) second conductive pattern 721 can be set between $[(5-0)/3]*(1-1)$ and $[(5-0)/3]*1$, i.e. between 0~1.67. Deduced by analogy, the first value range detected by the second (m=2) second conductive pattern 722 can be set between $[(5-0)/3]*(2-1)$ and $[(5-0)/3]*2$, i.e. between 1.67~3.33, and the first value range detected by the third (m=3) second conductive pattern 723 can be set between $[(5-0)/3]*(3-1)$ and $[(5-0)/3]*3$, i.e. between 3.33~5.

After the first value ranges are defined, the inspection and judgement can be performed. The first (m=1) second conductive pattern 721 responses the first (n=1) first conductive pattern 713 through the conductive path shown as the dot lines in FIG. 7, and detects a sensing voltage signal Vs=5V (volts). Obviously, the sensing voltage signal Vs is not within the first value range 0~1.67, so that it is regarded as a miss-detected value, and is obviated. Therefore, the sensing block III is not misjudged to be touched. Conversely, the first (m=1) second conductive pattern 721 responses the third (n=3) first conductive pattern 711 and detects that the sensing voltage signal Vs is closed to 0V or less than 1.67V (an actual value thereof can be obtained according to the voltage-dividing calculation), which is within the first value range 0V~1.67V, so that it is regarded as a correct value and is output as the coordinates of the first direction.

Similarly, the steps S828~S832 can also apply the above method, by which the sensing voltage signal detected by the first electrode is compared to the second value range to determine whether it is a miss-detected value, and a driving method flow thereof is as follows. First, a third voltage V3 is provided to the second electrode located at one end of the m-th second conductive pattern (for example, the 5V voltage is input to Y11, Y21 or Y31). Next, a fourth voltage V4 is provided to the second electrode located at another end of the same m-th second conductive pattern (for example, the 0V voltage is input to Y10, Y20 or Y30). Then, at least one of the first electrodes (for example, X10~X31) located at the two ends of the n-th first conductive pattern detects another sensing voltage signal Vf. Now, the first electrodes X10 and X11 can detect a 5V voltage or a voltage closed to 5V (the sensing voltage signal Vf), and the first electrodes X30 and X31 can also detect the 5V voltage (the sensing voltage signal Vf). The above two sensing voltage signals Vf are compared to the second value range to determine whether the sensing voltage signals Vf are within a range of $[(V3-V4)/nt]*(n-1)<Vf<[(V3-V4)/nt]*n$. If the sensing voltage signal Vf is within the second value range, the coordinates of the second direction are then output, and if the sensing voltage signal Vf is not within the first value range, the sensing voltage signal Vf is then regarded as a miss-detected value, and is obviated.

Now, the second value range detected by the first (n=1) first conductive patterns 711 can be set between 0~1.67, the second value range detected by the second (n=2) first conductive patterns 712 can be set between 1.67~3.33, and the second value range detected by the third (n=3) first conductive patterns 713 can be set between 3.33~5.

After the first value ranges are defined, the inspection and judgement can be performed. The first (n=1) first conductive pattern 713 responses the first (m=1) second conductive pattern 721 through a reversed conductive path shown as the dot lines in FIG. 7, and detects a sensing voltage signal Vf=5V (volts). Obviously, the sensing voltage signal Vf is not within the second value range 0~1.67, so that it is regarded as a miss-detected value, and is obviated. Therefore, the sensing block III is not misjudged to be touched. Conversely, the third (n=3) first conductive pattern 711 responses the first (m=1) second conductive pattern 721 and detects that the sensing voltage signal Vf is closed to 5V or greater than 3.33V (an actual value thereof can be obtained according to the voltage-dividing calculation), which is within the second value range 3.33V~5V, so that it is regarded as a correct value and is output as the coordinates of the second direction.

The incorrect sensing voltage signals can be filtered according to the steps S818~S822 and the steps S828~S832, so that the driving chip can output correct single or multi touch coordinates positions. Moreover, the steps S814~S836 can be regarded as further descriptions of the step S450 of FIG. 4.

In the steps S816~S838, detections are performed in the analog mode. For example, the detections are performed by respectively inputting the scan signal to each of the conductive patterns. In another analog mode detection method, during the driving process, the electrodes located at a same side of the touch panel can be shorted. For example, referring to FIG. 7, during the driving process of scan and detection, the electrodes located at two ends of the first or the second conductive patterns can be shorted by the driving chip. In detail, the first electrodes X10, X20 and X30 in all of the first electrodes X10~X31, that are located at the same ends of the first conductive patterns 711~713 are mutually shorted to simultaneously receive a first voltage (for example, a 0V voltage). The other first electrodes X11, X21 and X31 located at the other ends of the first conductive patterns 711~713 are mutually shorted to simultaneously receive a second voltage (for example, a 5V voltage), so as to form a first voltage difference between the two ends of the first conductive patterns, i.e. to form a 5V voltage difference to serves as the scan signal. Meanwhile, the second electrodes Y10, Y20 and Y30 in all of the second electrodes Y10~Y31, that are located at the same ends of the second conductive patterns 721~723 are mutually shorted, and the other second electrodes Y11, Y21 and Y31 located at the other ends of the second conductive patterns 721~723 are mutually shorted. Now, the second electrodes can detect at least one voltage-dividing signal obtained based on calculation of the first voltage difference, and transmit it back to the driving chip to define the coordinates of the first direction. For example, if a 0.5V voltage is detected, the coordinates of the first direction are slanted toward a left side of the touch panel 700, and if a 4V voltage is detected, the coordinates of the first direction are slanted toward a right side of the touch panel 700. Next, by using the same driving method, the second electrodes Y11, Y21 and Y31 located at the upper ends of the first conductive patterns 721~723 are mutually shorted to simultaneously receive a third voltage (for example, a 5V voltage), and the other second electrodes Y10, Y20 and Y30 are mutually shorted to simultaneously receive a fourth voltage (for example, a 0V voltage), so as to form a second voltage difference (5V) between the two ends of the second conductive pattern to serves as the scan signal. Now, the first electrodes X10~X30 located at the left ends of the first conductive patterns are mutually shorted, and the first electrodes X11~X31 located at the right ends of the first conductive patterns are also shorted. If the first electrode is taken as a detecting electrode, a voltage-dividing signal is obtained according to calculation of the second voltage difference, and is transmitted back to the driving chip to define the coordinates of the second direction. Finally, an accurate touch coordinates position is obtained by combining the coordinates of the first direction and the coordinates of the second direction.

Referring to FIG. 7, FIG. 8A and FIG. 8B, the steps S802~S838 can be serially connected to firstly perform a digital detecting and then perform an analog detecting. For example, the driving chip firstly defines the touched sensing blocks I and IX through the digital detecting mode (steps S802~S806), and then the analog detecting mode is entered (step S810) to execute the steps S816~S838 of a B flow of FIG. 8B. Different from the above analog detecting mode, an operation of switching the detecting mode is performed by the driving controller before the steps S816~S838 are executed (step S814). In other words, when the touched sensing blocks I and IX are defined, the first conductive pattern 711 and the second conductive pattern 721 corresponding to the sensing block I are switched to the analog detecting mode, and the first conductive pattern 713 and the second conductive pattern 723 corresponding to the sensing block IX are also switched to the analog detecting mode. By such means, advantages of the digital detecting mode and the analog detecting mode can be combined, so that not only the multi-touch function is achieved, but also the accurate touched positions are measured. The driving method thereof is shown in steps S802~S838, and detailed descriptions thereof are not repeated.

Fourth Embodiment

Figure 9:
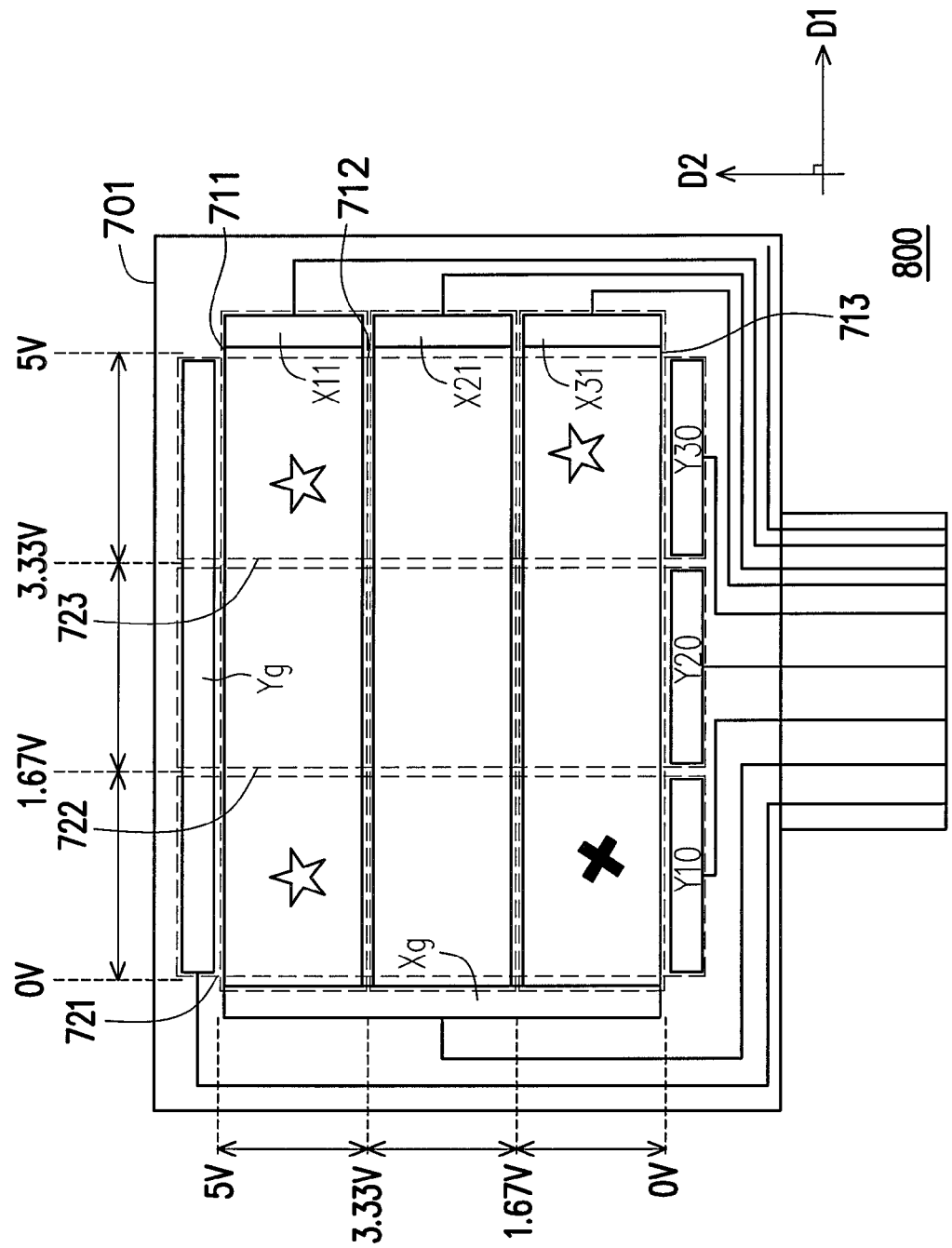
FIG. 9 is a top view of a touch panel 800 according to a fourth embodiment of the present invention.

FIG. 9 is a top view of a touch panel 800 according to the fourth embodiment of the present invention. Referring to FIG. 9, compared to the touch panel 700 of FIG. 7, another electrode design is applied in the present embodiment to reduce a frame size of the touch panel 800. As shown in FIG. 9, when the driving controller switches the touch panel 800 to the analog mode, the left side of the touch panel 800 only has one first electrode Xg, and the first electrode Xg is connected to the left ends of all of the first conductive patterns 711~713 for receiving a first voltage (for example, the 0V voltage). The other first electrodes X11, X21 and X31 still have the same design as that shown in FIG. 7, and are respectively connected to the right ends of the corresponding first conductive patterns 711~713 to receive a second voltage (for example, the 5V voltage). Similarly, the upper side of the touch panel 800 only has one second electrode Yg, and the second electrode Yg is connected to the upper ends of all of the second conductive patterns 721~723 for receiving a third voltage (for example, the 5V voltage). The other second electrodes Y11, Y21 and Y31 still have the same design as that shown in FIG. 7, and are respectively connected to the lower ends of the corresponding second conductive patterns 721~723 to receive a fourth voltage (for example, the 5V voltage). An advantage of such design is that a number of the leading wires connecting the first electrodes and the second electrodes to the driving chip can be reduced, so that an area occupied by the leading wires can be reduced. The driving method of this embodiment can be deduced by analogy according to the aforementioned methods, and therefore detailed descriptions thereof are not repeated.

Figure 10:
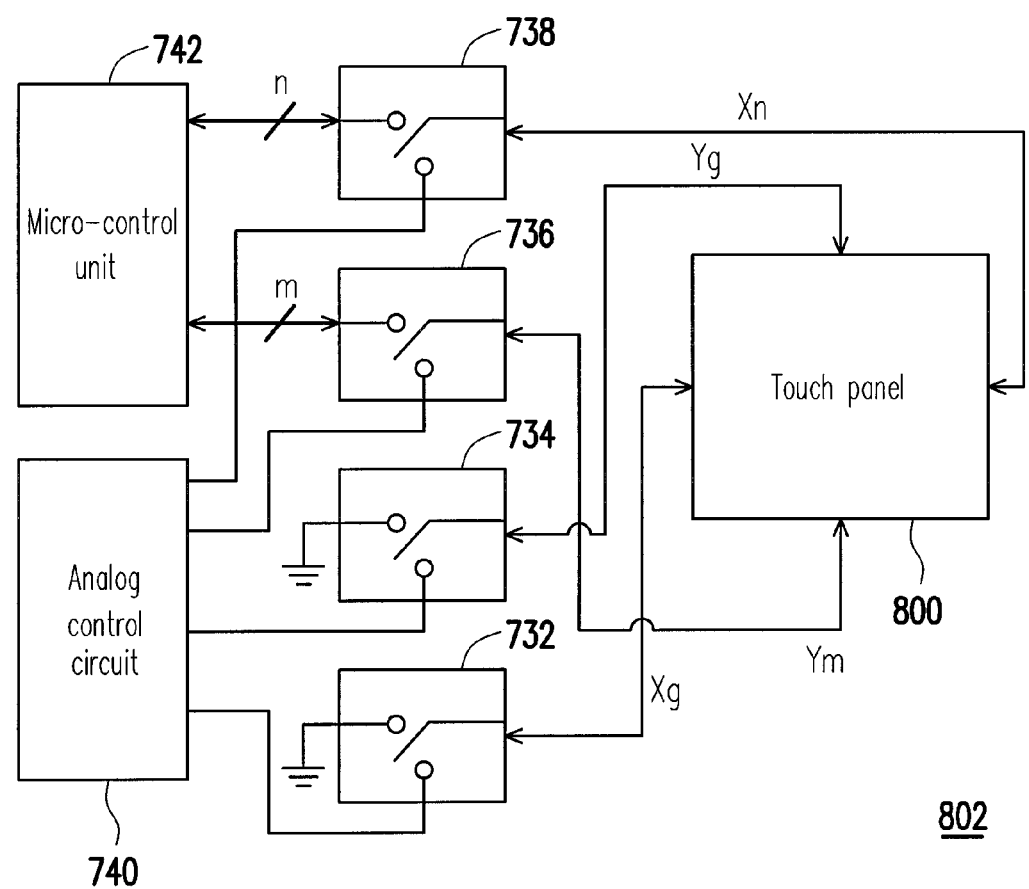
FIG. 10 is a diagram illustrating a touch control device 802 according to a fourth embodiment of the present invention.

Referring to FIG. 9 and FIG. 10, FIG. 10 is a diagram illustrating a touch control device 802 according to the fourth embodiment of the present invention, by which a relation among the touch panel 800, the driving control circuit of the driving chip and the switch circuit in the touch control device 802 is illustrated. As shown in FIG. 10, an analog control circuit 740 is coupled to a micro-control unit 742, wherein the micro-control unit (MCU) 742 includes a digital control circuit (not shown). The electrodes located at four sides of the touch panel 800 are respectively connected to the corresponding multiplexers. For example, the electrode Xg is connected to a multiplexer 732, the electrode Yg is connected to a multiplexer 734, wherein the multiplexers 732 and 734 are all coupled to the ground. The first electrodes X11, X21 and X31 are respectively connected to corresponding three multiplexers 738, and now n=3, which represents that three multiplexers are electrically connected to the right side of the touch panel 800. Similarly, the second electrodes Y11, Y21 and Y31 are also respectively connected to corresponding three multiplexers 736, and now m=3, which represents that three multiplexers are electrically connected to the upper side of the touch panel 800. The multiplexers 732~738 form the so-called switch circuit for switching the touch panel 800 to the digital mode or the analog mode according to a control signal.

For example, when the touch panel 800 is about to be operated in the multi-touch mode according to information transmitted by the control signal, the MCU 742 controls the switch circuit to switch the touch panel 800 to the multi-touch mode, i.e. the digital detecting mode or the hybrid mode including the digital detecting mode and the analog detecting mode. Now, a scanning method thereof is that the conductive patterns are scanned separately and in order. Conversely, when the touch panel 800 is about to be operated in the single-touch mode according to the information transmitted by the control signal, the MCU 742 controls the switch circuit to couple the multiplexers 732~738 to the analog control circuit 740, and short the first electrodes X11, X20 and X31, and also short the second electrodes Y10, Y20 and Y30. The driving method of this embodiment is similar to the plurality of driving methods of the third embodiment, and therefore detailed descriptions thereof are not repeated.

In summary, the driving controller and driving method provided by the present invention are mainly used for switching the operation modes of the touch panel, by which the user can switch the touch panel to the digital mode of multi-touch or the analog mode with a high resolution according to actual requirements. Moreover, the advantages of the digital mode and the analog mode can be combined to achieve the multi-touch function having the high resolution.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A resistive touch control device, comprising:
   a touch panel, comprising:
      a first transparent substrate;
      a plurality of first conductive patterns, disposed on the first transparent substrate, each of the first conductive patterns extending along a first direction, and the first conductive patterns being mutually parallel;
      a plurality of first electrodes, disposed on each of the first conductive patterns at two ends along the first direction;
      a second transparent substrate, disposed at a side opposite to the first transparent substrate;
      a plurality of second conductive patterns, disposed on the second transparent substrate, the first conductive patterns and the second conductive patterns located between the first transparent substrate and the second substrate, each of the second conductive patterns extending along a second direction, and the second conductive patterns being mutually parallel, wherein the first direction is intersected to the second direction;
      a plurality of second electrodes, disposed on each of the second conductive patterns at two ends along the second direction;
      a plurality of spacers, disposed between the first transparent substrate and the second transparent substrate to form a space between the first conductive patterns and the second conductive patterns, wherein overlapped areas of the first conductive patterns and the second conductive patterns are defined as a plurality of sensing blocks; and
   a driving controller, for setting the touch control device to a digital mode or an analog mode, wherein the driving controller comprises:
      a digital control circuit, for scanning and detecting touched sensing blocks in the touch panel to correspondingly output a matrix data when the driving controller is operated in the digital mode;
      an analog control circuit, for detecting and calculating a touched position of the touch panel to correspondingly output touch coordinates when the driving controller is operated in the analog mode; and
      a switch circuit, for switching the driving controller to the digital mode or the analog mode according to a control signal, wherein the switch circuit comprises at least four switch groups, and each of the switch groups has a plurality of first multiplexers, the first multiplexers of each of the switch groups are respectively coupled to the first or the second electrodes located at a same side of the touch panel, and the first multiplexers couple the electrodes to the digital control circuit or the analog control circuit according to the control signal, wherein when the driving controller is operated in the digital mode, the first multiplexers are respectively coupled to the digital control circuit, and when the driving controller is operated in the analog mode, the first multiplexers in each of the switch groups are mutually shorted and coupled to the analog control circuit.

2. The resistive touch control device as claimed in claim 1, wherein part of the first electrodes is connected to one end of each of the first conductive patterns for receiving a first voltage, and the other first electrodes are respectively connected to another end of each of the first conductive patterns for receiving a second voltage, one of the second electrodes is connected to one end of each of the second conductive patterns for receiving a third voltage, and the other second electrodes are respectively connected to another end of each of the second conductive patterns for receiving a fourth voltage.

3. A driving method for a resistive touch control device, comprising:
   providing a touch panel, the touch panel comprising:
      a first transparent substrate;
      a plurality of first conductive patterns, disposed on the first transparent substrate, each of the first conductive patterns extending along a first direction, and the first conductive patterns being mutually parallel;
      a plurality of first electrodes, disposed on each of the first conductive patterns at two ends along the first direction;
      a second transparent substrate, disposed at a side opposite to the first transparent substrate;
      a plurality of second conductive patterns, disposed on the second transparent substrate, the first conductive patterns and the second conductive patterns located between the first transparent substrate and the second substrate, each of the second conductive patterns extending along a second direction, and the second conductive patterns being mutually parallel, wherein the first direction is intersected to the second direction;

a plurality of second electrodes, disposed on each of the second conductive patterns at two ends along the second direction;

a plurality of spacers, disposed between the first transparent substrate and the second transparent substrate to form a space between the first conductive patterns and the second conductive patterns, wherein overlapped areas of the first conductive patterns and the second conductive patterns are defined as a plurality of sensing blocks;

providing a driving controller, for setting the touch control device to a digital mode or an analog mode, wherein the driving controller comprises:

a digital control circuit;

an analog control circuit; and a switch circuit, wherein the switch circuit comprises at least four switch groups, and each of the switch groups has a plurality of first multiplexers, the first multiplexers of each of the switch groups are respectively coupled to the first or the second electrodes located at a same side of the touch panel;

switching the resistive touch control device to the digital mode or the analog mode according to a control signal by the driving controller, wherein the first multiplexers couple the electrodes to the digital control circuit or the analog control circuit according to the control signal;

scanning and detecting touched sensing blocks in the touch panel to correspondingly output a matrix data by the digital control circuit when the driving controller is operated in the digital mode and the first multiplexers are respectively coupled to the digital control circuit; and detecting and calculating a touched position of the touch panel to correspondingly output touch coordinates by the analog control circuit when the driving controller is operated in the analog mode and the first multiplexers in each of the switch groups are mutually shorted and coupled to the analog control circuit.

4. A driving method, for driving the resistive touch control device as claimed in claim 3, the resistive touch control device further comprising at least a driving chip, and the driving method comprising:

generating a plurality of digital signals by the driving chip;

inputting the digital signals to the first conductive patterns through the first electrode to perform scanning;

detecting one of the digital signals by at least one of the second conductive patterns, and transmitting the digital signal back to the driving chip to define at least one sensing block touched by a user; and outputting a matrix data corresponding to the sensing block.

5. The driving method as claimed in claim 4 further comprising:

detecting a plurality of the digital signals by the second conductive patterns, and transmitting the digital signals back to the driving chip to define a plurality of sensing blocks touched by a user; and outputting a plurality of matrix data corresponding to the sensing blocks.

6. A driving method, for driving the resistive touch control device as claimed in claim 3, the resistive touch control device further comprising at least a driving chip, and the driving method comprising:

sequentially inputting different voltages to two ends of the first conductive patterns through the second electrodes by the driving chip;

detecting at least one sensing voltage signal (Vs) by the second electrodes, and transmitting it back to the driving chip to define at least one coordinates of the first direction;

sequentially inputting different voltages to two ends of the second conductive patterns through the second electrodes by the driving chip;

detecting at least another one sensing voltage signal (Vf) by the first electrodes, and transmitting it back to the driving chip to define at least one coordinates of the second direction;

obtaining an accurate coordinates position by combining the coordinates of the first direction and the coordinates of the second direction; and outputting the accurate coordinates position as touch coordinates.

7. The driving method as claimed in claim 6 further comprising:

respectively inputting different voltages to the first electrodes located at two ends of each of the first conductive patterns to form a first voltage difference;

detecting at least one voltage-dividing signal obtained based on calculation of the first voltage difference by the second electrodes, and transmitting it back to the driving chip to define the coordinates of the first direction;

respectively inputting different voltages to the second electrodes located at two ends of each of the second conductive patterns to form a second voltage difference; and detecting at least one voltage-dividing signal obtained based on calculation of the second voltage difference by the first electrodes, and transmitting it back to the driving chip to define the coordinates of the second direction.

8. The driving method as claimed in claim 7 further comprising:

detecting at least two sensing voltage signals by the second electrodes, and transmitting them back to the driving chip to define a plurality of coordinates of the first direction;

detecting at least two sensing voltage signals by the first electrodes, and transmitting them back to the driving chip to define a plurality of coordinates of the second direction;

obtaining a plurality of coordinates positions by combining the coordinates of the first direction and the coordinates of the second direction; and outputting the coordinates positions as a plurality of touch coordinates.

9. The driving method as claimed in claim 6 further comprising:

comparing the sensing voltage signal (Vs) to a predetermined first value range;

outputting the coordinates of the first direction if the sensing voltage signal is within the first value range;

comparing the other sensing voltage signal (Vf) to a predetermined second value range; and outputting the coordinates of the second direction if the other sensing voltage signal is within the second value range.

10. The driving method as claimed in claim 9, wherein a number of the first conductive patterns extended along the first direction is $n_t$, wherein $n_t=1, 2, 3, \ldots, n-1, n, n+1, \ldots$, and n is a positive integer, and a number of the second conductive patterns extended along the second direction is $m_t$, wherein $m_t=1, 2, 3, \ldots, m-1, m, m+1, \ldots$, and m is a positive integer, and the driving method comprises:

provide a first voltage V1 to the first electrode located at one end of a n-th first conductive pattern, and providing a second voltage V2 to the first electrode located at another end of the n-th first conductive pattern;

detecting the sensing voltage signal Vs by at least one of the second electrodes located at two ends of a m-th second conductive pattern;

determining whether the sensing voltage signal Vs is within the first value range $[(V1-V2)/mt]*(m-1) < Vs < [(V1-V2)/mt]*m$; and outputting the coordinates of the first direction if the sensing voltage signal Vs is within the first value range, and regarding the sensing voltage signal Vs as a miss-detected value and obviating it if the sensing voltage signal Vs is not within the first value range.

11. The driving method as claimed in claim 10 further comprising:

providing a third voltage V3 to the second electrode located at one end of a m-th second conductive pattern, and providing a fourth voltage V4 to the second electrode located at another end of the m-th second conductive pattern;

detecting the other sensing voltage signal Vf by at least one of the first electrodes located at two ends of the n-th first conductive pattern;

determining whether the other sensing voltage signal Vf is within the second value range $[(V3-V4)/nt]*(n-1) < Vf < [(V3-V4)/nt]*n$; and outputting the coordinates of the second direction if the other sensing voltage signal Vf is within the second value range, and regarding the other sensing voltage signal Vf as a miss-detected value and obviating it if the other sensing voltage signal Vf is not within the second value range.

12. The driving method as claimed in claim 6 further comprising:

mutually shorting the first electrodes located at a same side of the first conductive patterns by the driving chip for simultaneously receiving a first voltage;

mutually shorting the other first electrodes located at another same side of the first conductive patterns by the driving chip for simultaneously receiving a second voltage, so as to form a first voltage difference between two ends of the first conductive patterns;

mutually shorting the second electrodes located at a same side of the second conductive patterns by the driving chip, and mutually shorting the other second electrodes located at another same side of the second conductive patterns by the driving chip;

detecting at least one voltage-dividing signal obtained based on calculation of the first voltage difference by the second electrodes, and transmitting it back to the driving chip to define the coordinates of the first direction;

mutually shorting the second electrodes located at a same side of the second conductive patterns by the driving chip for simultaneously receiving a third voltage;

mutually shorting the other second electrodes located at another same side of the second conductive patterns by the driving chip for simultaneously receiving a fourth voltage, so as to form a second voltage difference between two ends of the second conductive patterns;

mutually shorting the first electrodes located at a same side of the first conductive patterns by the driving chip, and mutually shorting the other first electrodes located at another same side of the first conductive patterns by the driving chip; and detecting at least one voltage-dividing signal obtained based on calculation of the second voltage difference by the first electrodes, and transmitting it back to the driving chip to define the coordinates of the second direction.

13. A driving method, for driving the resistive touch control device as claimed in claim 3, the resistive touch control device further comprising at least a driving chip, and the driving method comprising:

respectively inputting a digital signal to the first conductive patterns through the first electrodes by the driving chip, so as to perform a scanning;

detecting the digital signal by at least one of the second conductive patterns, and transmitting the digital signal back to the driving chip to define at least one touched sensing block;

respectively inputting different voltages to two ends of the first conductive pattern corresponding to the sensing block;

detecting a sensing voltage signal by two ends of the second conductive pattern corresponding to the sensing block, and transmitting it back to the driving chip to define the coordinates of the first direction;

respectively inputting different voltages to two ends of the second conductive pattern corresponding to the sensing block;

detecting another sensing voltage signal by two ends of the first conductive pattern corresponding to the sensing block, and transmitting it back to the driving chip to define the coordinates of the second direction; and combining the coordinates of the first direction and the coordinates of the second direction to obtain an accurate coordinates position.

14. The driving method as claimed in claim 13 further comprising:

detecting a plurality of the sensing voltage signals by the second electrodes, and transmitting them back to the driving chip to define a plurality of coordinates of the first direction;

detecting a plurality of the sensing voltage signals by the first electrodes, and transmitting them back to the driving chip to define a plurality of coordinates of the second direction; and combining the coordinates of the first direction and the coordinates of the second direction to obtain a plurality of coordinates positions.

* * * * *